Figure 1:
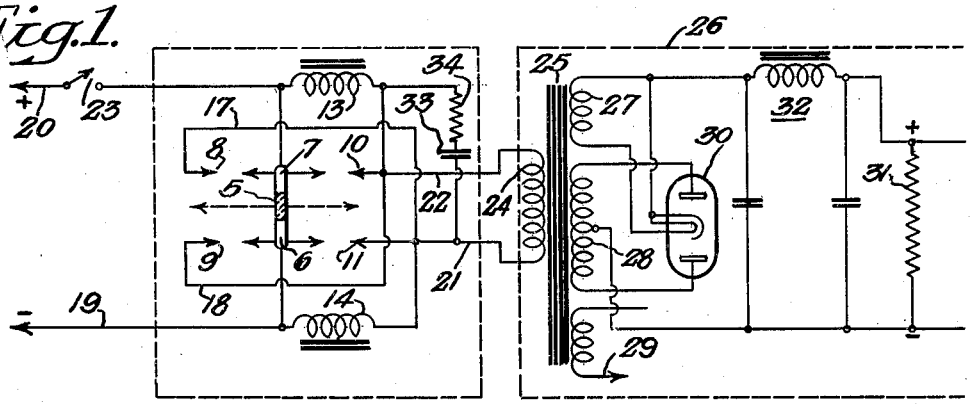

June 21, 1938.  A. D. BURT  2,121,421

VIBRATOR POWER SUPPLY SYSTEM

Filed June 16, 1936

Inventor
Alexander D. Burt
By
J. Huff
Attorney

Patented June 21, 1938

2,121,421

UNITED STATES PATENT OFFICE 2,121,421

VIBRATOR POWER SUPPLY SYSTEM

Alexander D. Burt, Narberth, Pa., assignor to Radio Corporation of America, a corporation of Delaware Application June 16, 1936, Serial No. 85,525

8 Claims. (Cl. 171—97)

The present invention relates to a vibrator power supply or inverter system for radio receiving apparatus and the like, comprising a power supply transformer and a vibrator device for controlling the primary current in connection with a low voltage battery supply source or any suitable source of direct current power to provide a higher alternating current or rectified alternating current voltage for the anode and other circuits of such apparatus.

A vibrator current-interrupting device requires the use of an electro-magnet or vibrator coil, controlled by contacts to impart a vibratory motion to an armature element. In certain types of vibrators, the electro-magnet is controlled by contacts which are simultaneously used to interrupt the primary current of the transformer, usually requiring the vibrator coil to be short-circuited. For full wave operation the transformer primary may be provided with two sections which are alternately energized.

It is an object of the present invention to provide a vibrator power supply system which not only eliminates additional contact means for the vibrator electromagnet or coil, but provides full wave operation without the necessity for a mid-tap on the transformer winding, thereby more effectively utilizing the full winding on each half wave.

The invention is therefore applicable to any power supply circuit requiring an alternating current derived from a direct current source of power and including an alternating current load such as an existing inductive winding therefor, which may not be provided with a center tap or which is wholly incapable of being tapped between the input terminal ends.

This has the further advantage that for use with a transformer, the latter may be more efficient for the same physical size or may be made of smaller dimensions and at lower cost for the same efficiency, for the reason that the whole primary winding is utilized for each half wave.

It is a further object of the present invention, to provide a power supply device of the vibrator-inverter type which may be used in conjunction with a standard alternating current receiver or the like without additional apparatus, whereby the receiver may be operated interchangeably in conjunction with a direct current source of power or directly in connection with a standard commercial supply outlet for alternating current.

For example, it may be desirable to operate a standard alternating current receiver in a location wherein only direct current power is available, or in a location having no power source other than a portable storage battery, and accordingly the device of the present invention readily provides suitable alternating current from any direct current source without the necessity for a special double winding transformer device.

In this connection, it is a still further object of the present invention, to provide an improved vibrator current-interrupter adapted for operation in conjunction with any power input winding for an inverter transformer or the like, to provide full wave operation without the necessity for providing said winding with a center tap.

The invention will be better understood from the following description, when considered in connection with the accompanying drawing, and its scope will be pointed out in the appended claims.

Figure 2:
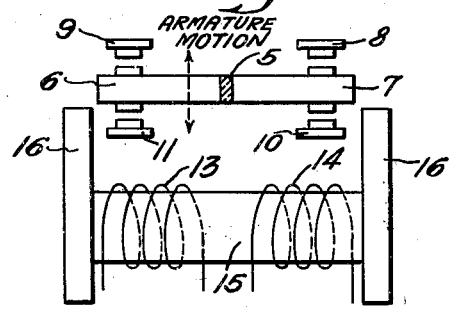
Figure 3:
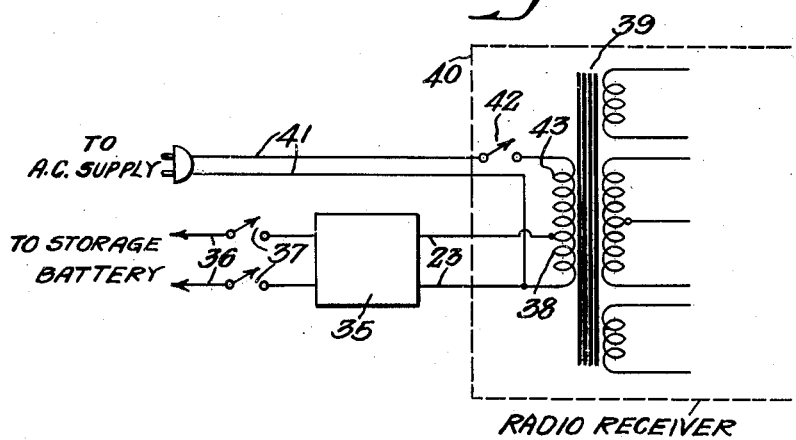

In the drawing, Fig. 1 is a schematic diagram of a vibrator power supply system embodying the invention, Fig. 2 is a schematic plan view of the vibrator device shown in Fig. 1, showing the relation of the main physical parts thereof constituting the contact actuating means, and Fig. 3 is a similar schematic circuit diagram showing a modification of the circuit of Fig. 1.

Referring to Figs. 1 and 2, two movable or vibratory contact members 6 and 7 joined and insulated as indicated at 5, provide an armature in a vibratory path indicated by the dotted arrows from making and breaking connection with fixed contacts 8 and 9 arranged in spaced, opposed relation to fixed contacts 10 and 11 on opposite sides of the armature.

The armature is actuated by an electromagnet or coil comprising two electrically separate windings 13 and 14 carried on a core 15 having pole pieces 16, as shown in Fig. 2. The pairs of opposed contacts 9—11 and 8—10 are cross-connected through leads 17 and 18 to provide pairs of reversing contacts between which the movable contact members 6 and 7 move or vibrate in response to energizing the operating coil windings which are connected across the operating contacts in a manner to be alternately short circuited, and energized in parallel as will hereinafter appear, from the low voltage supply or input circuit represented by supply leads 19 and 20. The leads 19 and 20 are adapted to be connected with any suitable direct current source of power such as a storage battery (not shown). A power switch 23 is provided in one of the supply leads 20.

The cross-connected contacts of the two pairs of opposed contacts, may be connected as a vibratory reversing switch means for supplying interrupted and reversing current through output leads 21 and 22 to the primary winding 24 of a step-up power supply transformer 25 for apparatus indicated in outline at 26, which may be a radio receiver or similar apparatus requiring alternating or direct current potential at a higher voltage.

In the present example, the cross-connected fixed contacts 8—11 and 9—10 are connected with the output leads 21 and 22 respectively, while the input leads 19 and 20 are connected with the movable contact members 6 and 7 respectively.

The transformer 25 is adapted to provide power for and from part of the radio receiver or apparatus in which it is included and for this purpose, the secondary may comprise a plurality of windings 27, 28 and 29, the windings 27 and 28 supplying a rectifier device 30 connected with an anode current output resistor 31 through a suitable filter indicated at 32. The winding 29 is a filament or heater winding for the receiver. The secondary load means is shown only by way of example, as representing any power supply unit for a radio receiver or the like having a power supply transformer.

The current interrupting and reversing contacts may be utilized to control the vibrator electromagnet or coil when the same is provided in two sections as shown. To this end, the sections 13 and 14 of the winding are each connected in series with the primary winding across contacts which close when the armature moves in the direction of the pole pieces 16. In the present example, these contacts are the movable contacts and the fixed contacts 10 and 11. The coil section 13 is connected across the contacts 7 and 10 and the coil section 14 is connected across the contacts 6 and 11.

Referring to Fig. 2, it will be noted that these contacts are normally open as the armature is normally positioned mid-way between the reversing contacts and in a position to be attracted by the pole pieces 16. When the switch 23, shown in Fig. 1, is closed to energize the vibrator, the current flows from the supply lead 20 through one of the coil sections, such as the section 13, for example, thence through the output lead 22 and through the primary winding 24, returning through the other lead 21 and the coil section 14 to the other supply lead 21.

The resulting current flow is arranged to be sufficient to cause the armature to be attracted, the coil windings acting in aiding relation, and the contacts 10 and 11 are closed with the corresponding movable contacts 7 and 6 respectively. This de-energizes the operating coil and applies full supply voltage to the primary winding since the lead 20 is then directly connected through contacts 7—10 to the output lead 22 and the lead 19 is directly connected with the output lead 21 through the contacts 6—11, thereby fully energizing the primary winding in one direction.

With the winding sections de-energized, the armature is permitted to return in the opposite direction under the action of suitable restoring means such as a spring (not shown) and the mass action of the armature in motion, thereby causing the contacts 8 and 9 to be closed with the moving contacts 7 and 6 respectively. This operation places the windings 13 and 14 in parallel across the supply leads 19 and 20, whereby they are fully energized and reverses the direction of flow of current in and fully energizes the entire primary winding 24 in the opposite direction. The primary circuit may be traced from the lead 20 through the contacts 7 and 8 and the cross over lead 17 to the primary or output lead 21, through the primary winding, and returning through the other output lead 22, the cross-over lead 18, and contacts 6—9 to the other supply lead 19.

The armature is then fully attracted in the opposite direction and is caused to re-engage with the contacts 10 and 11 and continuing the operation above described. A capacitor 33 which may be connected in series with a current limiting resistor 34 is provided across the output leads 21 and 22 and the primary winding, as means for limiting the contact wear by arcing and serves to limit the peaks of counter electromotive force developed by reversal of the primary current.

The complete utilization of the primary winding for full wave operation permits the power transformer to be of smaller size and of lower cost, and eliminates the cost of bringing out an additional center tap. Each half of the vibrator coil is connected across the contacts which are closed when the armature is moved in the direction of the pole pieces of the electromagnet whereby the primary contacts are used effectively for controlling the vibrator motor means.

When the device is de-energized by opening the supply switch 22, the armature returns to the mid position shown in Fig. 2, and serves to open-circuit the primary connection whereby the latter may be utilized for receiving power supply from other sources, the leads 21 being provided with suitable switch means or removed from the supply source. For example, referring to Fig. 3, a system for this purpose is shown.

In Fig. 3, the vibrator unit of Fig. 1 is indicated at 35 and is provided with switch means 37 in each lead for connection with a direct current supply source as indicated, and the output leads 23 are connected with a primary winding 38 for a power transformer 39 of a radio receiver 40. In conjunction with the transformer 39 there is also provided a suitable winding for receiving alternating current power in connection with supply leads indicated at 41 having a power control switch 42 in the receiver. In the present example, the alternating current winding includes the winding 38.

With this arrangement a radio receiver or other apparatus may be operated in conjunction with a direct current voltage supply source such as a battery in locations not provided with power service and may be connected with the alternating current supply where available as the two windings may be placed upon the same transformer core and may be joined or included in one winding, for the reason that no center tap is required for either connection with the primary winding.

The system shown and described has the advantage, that in a vibrator-inverter, the two coil vibrator device povides means for operating a standard radio apparatus such as a radio receiver having the usual power transformer provided with an untapped primary winding, and this arrangement is provided without necessitating an additional contact on the vibrator device for operating the motor means thereof or additional switching or control apparatus.

I claim as my invention:

1. In a vibrator-inverter system for high voltage power supply from a direct current source, a vibrator device having a movable armature providing two movable contact elements, fixed opposed contacts on opposite sides of said armature for engaging said movable contact elements, said fixed contacts being cross-connected to provide reversing means for a supply current transmitted therethrough, a transformer having a primary winding connected with said reversing means for receiving a full wave reversing current therefrom, and actuating windings for said armature one in each leg of the primary winding connection, and each of which windings is connected between a movable contact element and a fixed contact element which closes therewith in the attracted position of the armature.

2. In a power supply system for radio receiving apparatus and the like, a power supply transformer having a primary winding, and means connected with said winding for applying thereto energizing direct current in opposite directions alternately, comprising a vibrator device providing two pairs of opposed spaced contacts and a contact movable between the contacts of each pair, an electromagnet for operating said contacts having two windings, connected one in each leg of the primary winding connection and between one of said movable contacts and one of the fixed contacts in such a manner that said windings are alternately short-circuited and connected in parallel across the supply source.

3. In a vibrator power supply system, the combination of power supply leads, a power transformer having a primary winding connected therewith, vibrator means providing a reversing switch for alternately energizing said entire winding in opposite directions from said leads and including two actuating windings, one connected serially in each of said supply leads, and means providing connections for said windings with said reversing switch means, whereby said windings are alternately short-circuited and connected in parallel across said supply leads.

4. In an electrical vibrator, the combination of a movable armature, contacts carried by said armature, an electromagnet for actuating said armature comprising two windings, two pairs of opposed contacts arranged to cooperate with said armature contacts to provide reversing switch means, power supply leads, means providing connections for said windings whereby they are located in separate supply leads and with said contacts whereby said windings are de-energized in the attracted position of the armature and energized in parallel when the armature moves in an opposite direction, and means providing an alternating current load for receiving current through said reversing switch means and supply leads, including a winding through which the current from said reversing switch means is caused to flow in opposite directions.

5. The combination with electrical apparatus having a power supply winding, of means for causing a direct current to traverse said winding in opposite directions comprising a vibrator device having contacts providing a reversing switch, a pair of direct current supply leads connected to said winding through said reversing switch, and means for actuating said switch comprising an armature and an electromagnet associated therewith, said electromagnet comprising two windings each of which is connected with a pair of contacts in said reversing switch to be short-circuited when the armature moves in the direction of attraction by the electromagnet, and to be connected in parallel across said supply leads when the armature is moved in the opposite direction.

6. A power supply system comprising in combination, a power supply apparatus having an input winding, electrical vibrator means having operating contacts connected and arranged to provide a vibratory reversing switch, means including positive and negative supply leads for supplying current alternately through said winding in opposite directions through said switch, a movable armature for actuating said switch and an electromagnet associated therewith for imparting motion to said armature comprising two windings polarized and connected one in each of the leads of said current supply means to operate magnetically in aiding relation to each other and further being connected with the contacts of said reversing switch means whereby they are short-circuited in the attracted position of the armature and energized in parallel when the armature moves in the opposite direction in the operation of said switch means.

7. In a vibrator-inverter system, the combination of a vibrator device comprising two pairs of opposed contacts, means providing contact elements movable between the contacts of said pairs of opposed contacts and being normally open-circuited with respect thereto, an armature member carrying said contact elements, an electromagnet associated with the armature to cause the armature to vibrate, said electromagnet comprising two windings each connected between one of said movable contact elements and one of each pair of said opposed contacts with which said movable contact elements engage when the armature is attracted by the electromagnet, means connecting one contact of each pair of opposed contacts on one side of the armature with a contact of the other pair of contacts on the opposite side of the armature to provide a two-circuit reversing-switch means, an alternating current device having an alternating current input winding whereby it is energized, and circuit means for energizing said winding through said reversing switch means and for energizing said windings in parallel.

8. A power supply system for radio receiving apparatus and the like comprising, in combination, a power transformer having a primary winding adapted to be energized from a low voltage source of power, positive and negative power supply leads connected with said primary winding, a vibrator motor winding connected serially in circuit between each of said leads and said primary winding, an armature adapted to be actuated by the energizing of said motor windings, a pair of insulated contacts carried by said armature and connected each with one of said supply leads, a pair of contacts connected each with one of said motor windings and arranged in operative relation to said armature contacts to short circuit said motor windings in the attracted position of the armature and to apply the full operating energy from said supply leads to said primary winding in the opposite direction from the attracted position, and a second pair of contacts connected with said motor windings and arranged in operative relation to said armature contacts to energize the said motor and primary windings in parallel upon return movement of the armature from the attracted position, and the direction of energy flow through the primary winding being reversed.

ALEXANDER D. BURT.